United States Patent Office 3,229,935
Patented Jan. 18, 1966

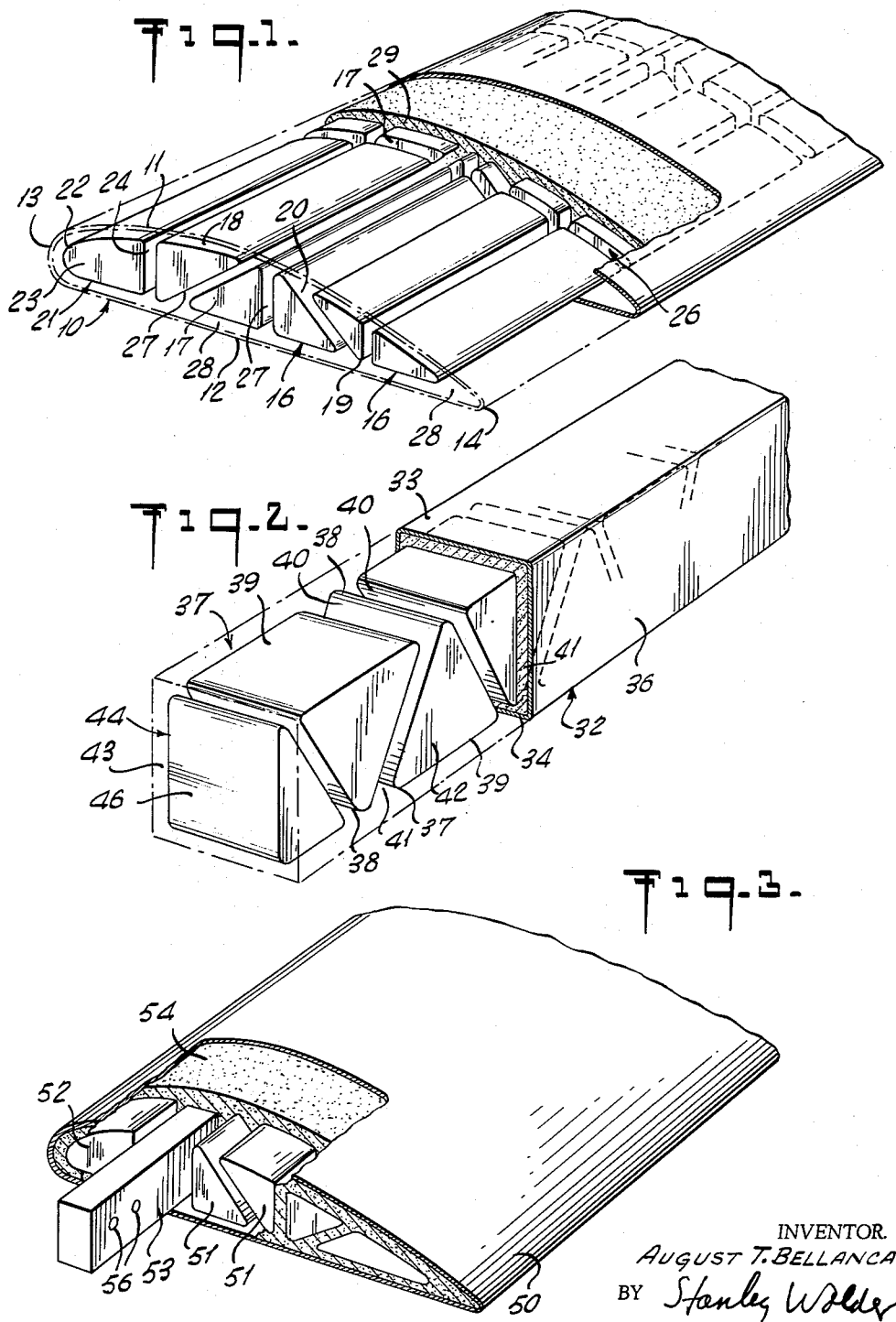

---

3,229,935
AIRCRAFT WING CONSTRUCTION
August T. Bellanca, Shorewood Farms, Galena, Md.
Filed Dec. 6, 1962, Ser. No. 242,878
11 Claims. (Cl. 244—123)

The present invention relates generally to improvements in structural members and it relates more particularly to improved lightweight high strength structures.

In the copending patent application Serial No. 588,930 of Guiseppi Mario Bellanca and August T. Bellanca, filed June 1, 1956, now Patent No. 3,078,202, there is described a lightweight high strength structure comprising an exterior shell, a plurality of spaced interior shells disposed within and spaced from the walls of the exterior shell, and a cohesive rigid lightweight cellular core filling the space delinated by the other surfaces of the interior shells and the inner surface of the exterior shell to define a peripheral structural section and transversely and longitudinally extending reinforcing panels. While the structure specifically described in the above patent application serves its function in an optimum manner in many applications, for certain uses the stress resisting properties thereof are not at their best. For example, in certain types of beams, particularly beams of great length, the resistance to bending loads, the earlier structures do not possess optimum characteristics.

It is thus a principal object of the present invention to provide an improved structural system.

Another object of the present invention is to provide an improved lightweight, high strength structure.

Still another object of the present invention is to provide an improved lightweight high strength structural member suitable for use with beams of various types and highly resistant to bending as well as other stresses.

A further object of the present invention is to provide an improved structural member employing a sandwiched foamed core formation.

Still a further object of the present invention is to provide a structure of the above nature characterized by its high strength to weight ratio, versatility and adaptability, ease of fabrication and low cost.

The above and other objects of the present invention will become apparent from a reading of the following description taken in conjunction with the accompanying drawing wherein:

FIGURE 1 is a fragmentary perspective view, shown partially broken away, of an aircraft wing embodying the present invention;

FIGURE 2 is a fragmentary perspective view, partially broken away, of a structural beam embodying the present invention; and FIGURE 3 is a fragmentary perspective view, partially broken away of another form of aircraft wing embodying the present invention.

In a sense the present invention contemplates the provision of a structure comprising a plurality of transversely spaced longitudinally extending triangular prismatic shells having spaced confronting walls, and a cohesive rigid lightweight cellular core substantially filling the spaces delineated by said confronting walls to define a truss structure.

The present structure may assume many shapes and configurations, as for example a beam or an aircraft wing. In accordance with the preferred form of the present structure as embodied in a beam there is provided an elongated longitudinally extending outer shell of rectangular transverse cross-section and there is disposed within the outer shell a plurality of transversely extending longitudinally spaced triangular prismatic closed inner shells. The apices of successive inner shells are directed alternately towards the upper and lower walls of the outer shell the bases thereof being spaced from and confronting the opposite walls of said outer shell. The adjacent side walls of the inner shells are parallel and longitudinally spaced from each other and the end walls thereof are parallel to and spaced from the outer shell side walls. The spaces delineated by the outer faces of the inner shells and the inner face of the outer shell are filled with a cohesive rigid lightweight cellular core which is adherent to the faces of the shells.

In accordance with another form of the present invention as applied to an aircraft wing, the outer shell is defined by a hollow longitudinally extending airfoil having upper and lower walls. A plurality of transversely spaced sets of longitudinally extending longitudinally spaced triangular prismatic closed inner shells are located within the outer shell, the end walls of corresponding inner shells being substantially coplanar. The side walls of adjacent inner shells are parallel and transversely spaced and the apices of successive inner shells are directed alternately toward the upper and lower outer shell walls and the bases thereof are parallel to and spaced from the opposite walls. The spaces delineated by the outer faces of the inner shells and the inner face of the outer shell are filled with a cohesive rigid lightweight cellular core adherent to the faces of the inner and outer shells. An elongated longitudinally extending well may be disposed between a pair of adjacent sets of the inner shells and have nested therein a longitudinally extending support beam.

The inner and outer shells are advantageously formed of a structural sheet or plate material, preferably of light weight, such as aluminum, magnesium and alloys thereof, synthetic organic plastic resin sheet or plate, such as for example the alkyd and polyester resins, advantageously reinforced with fiberglass or the like. The cellular core is advantageously a foamed in place synthetic organic plastic resin such as foamed in situ polyurethane and copolymers therewith, or other well known cellular plastic resins or other materials. In producing the improved structure, the inner shells are supported in any suitable manner with a minimum of obstruction within the outer shell and a foam forming composition in liquid form is metered into the spaces delineated by the outer faces of the inner shells and the inner face of the outer shell and permitted to expand and set in situ. Small openings may be formed in the outer shell to facilitate the desired distribution of the foam forming liquid composition. The expanded foam is an integral cohesive lightweight cellular body adherent along substantially the full extent thereof to the confronting faces of the shells to form therewith a unitary truss structure.

Referring now to the drawing and particularly to FIGURE 1 thereof which illustrates a preferred embodiment of the present invention as applied to an aircraft wing, the reference numeral 10 generally designates an outer shell of well known airfoil configuration having a curved top wall 11 and a substantially flat bottom wall 12, a relatively curved leading edge 13 and a sharply tapered trailing edge 14. It should be of course, understood that the outer shell 10 may assume other suitable configurations.

Positioned in the outer shell 10 and extending longitudinally and spaced from the walls thereof are a plurality of transversely spaced sets of longitudinally end to end spaced longitudinally extending triangular prismatic inner shells 16. Each of the inner shells 16 includes opposite triangular end walls 17, rectangular base wall 18, an apex 19 and side walls 20. The inner shells 21 located in the leading section of the outer shell 10 have curved leading faces 22 parallel to and spaced from the corresponding face of the outer shell 10 and include end walls 23 and trailing rectangular walls 24. The inner shells 16 and 21 of each series of transversely spaced shells are of substantially the same length and equally spaced from the confronting end walls of the next successive longitudinally spaced inner shells to delineate transversely extending spaces 26. The confronting faces of transversely successive inner shells 16 and 21 are parallel and substantially equally spaced to delineate longitudinally and vertically extending spaces 27 and the remaining walls of the inner shells 16 and 21 are substantially parallel to and equally spaced from the outer shell walls to delineate therewith a peripherally and longitudinally extending space 28. A plurality of spacer and support elements (not shown) are provided between the shells to properly locate them attendant to the fabrication of the subject structure.

The spaces delineated by the outer faces of the inner shells 16 and 21 and the inner faces of the outer shell 10 are filled, such as in the manner earlier set forth, with a rigid cohesive lightweight cellular core 29 which is an integral unit adherent throughout to the abutting shell faces to form an overall unitary structure of great strength and low weight, the core cooperating with the respective shell walls to define laminated structural components. The core filled peripheral space 28 with the sandwiching shell walls define a tubular sheath which is reinforced along its full extent by a truss structure defined by the core filling the spaces 27 and the sandwiching walls of the inner shells 16 and 21 and further reinforced by the transversely extending cores filling the spaces 26 and the sandwiching end walls 17 and 23, each of the structural components contributing to a high strength low weight assembly.

In FIGURE 2 of the drawing there is illustrated another embodiment of the present invention as applied to a structural beam. Specifically, the improved structural beam includes a longitudinally extending tubular outer shell 32 of rectangular transverse cross section, including top and bottom walls 33 and 34 respectively and side walls 36. Located in the outer shell 32 and extending along the length thereof are a plurality of transversely extending longitudinally spaced triangular prismatic inner shells 37 the apices 38 thereof being directed alternately to the outer shell upper and lower walls 33 and 34, the bases 39 of the inner shells being parallel to and spaced from the respective opposite confronting outer shell walls 33 and 34 to delineate therewith upper and lower horizontal spaces. The side walls 40 of successive inner shells 37 are longitudinally spaced and parallel to delineate longitudinally vertically inclined spaces 41 and the inner shell end walls 42 are parallel to and spaced from the outer shell side walls 36 to delineate therewith vertical side spaces 43. It should be noted that the inner shells 37 except for the end inner shells 44 are substantially equilateral whereas the end inner shells 44 are of right angle transverse cross section and include vertical side walls 46 which are spaced from and are parallel to the outer shell end walls.

As in the first described structure, the spaces delineated by the outer shell inner faces and the inner shell outer faces are filled with a rigid cohesive lightweight cellular core 47 which is an integral unit adherent throughout to the abutting shell faces to form an overall unitary longitudinal truss structure of laminate components comprising the core sections sandwiched by corresponding shell walls. It should be noted that the beam may assume other overall shapes and employ the truss structure. For example, the outer shell walls need not be parallel. The upper wall 33 may advantageously be upwardly inclined from opposite ends of the beam to an apex and the shapes of the inner shells correspondingly modified.

The aircraft wing illustrated in FIGURE 3 of the drawing differs from that shown in FIGURE 1 primarily in the provision of a longitudinally extending support beam registering with a corresponding well formed in the wing structure. Specifically, the aircraft wing structure includes an outer airfoil shaped shell 50 in which are disposed a plurality of transversely spaced sets of longitudinally spaced triangular prismatic inner shells 51 and a leading set of inner shells 52 corresponding to the shells 16 and 21 earlier described. It should be noted, however, that the spacing between the shells 52 and 51 is greater than that between successive shells 51. A longitudinally extending support beam 53 of rectangular transverse cross section is located between the confronting faces of the adjacent shells 51 and 52 and extends beyond the inner end of the wing. The upper and lower faces of the beam 53 are spaced from the upper and lower walls of the outer shell 50 and are coplanar with the corresponding faces of the inner shells 51. As in the first embodiment the spaces delineated by the faces of the inner and outer shells and the beam 53 are filled with an integral rigid cohesive cellular core 54 which is adherent to these faces to form a unitary structure. The section of the beam 53 projecting beyond the wing is provided with bores 56 to facilitate the engagement thereof and the securement of the wing to the aircraft body.

While there have been described and illustrated preferred embodiments of the present invention, it is apparent that numerous alterations, omissions and additions may be made without departing from the spirit thereof.

What is claimed is:

1. A structure comprising a plurality of transversely spaced triangular prismatic shells having spaced confronting walls, and a cohesive rigid lightweight cellular core substantially filling the spaces delineated by and adhering to said confronting walls to define a truss structure formed of triangular sections constituted of substantially linear elements including respective pairs of said confronting walls and correspondingly sandwiched cellular core sections.

2. A structure comprising upper and lower webs, a plurality of transversely spaced triangular prismatic shells disposed between said webs and having spaced confronting walls, and a cohesive rigid lightweight cellular core substantially filling the spaces delineated by and adhering to said confronting walls to define a truss structure formed of triangular sections constituted of substantially linear elements including respective pairs of said confronting walls and correspondingly sandwiched cellular core sections.

3. A structure comprising upper and lower webs, a plurality of transversely spaced triangular prismatic shells disposed between and spaced from said webs and having spaced confronting side walls and base and apices spaced from said webs, and a cohesive rigid lightweight cellular core substantially filling the spaces delineated by and adhering to said confronting walls and by said webs and said bases to define a truss structure formed of triangular sections constituted of substantially linear elements including respective pairs of said confronting walls, webs and bases and correspondingly sandwiched cellular core sections.

4. A structure comprising upper and lower webs, a plurality of transversely spaced triangular prismatic shells disposed between and spaced from said webs and having spaced confronting side walls and base and apices spaced from said webs, the apices of successive of said prismatic shells having apices directed alternately toward said upper and lower webs and the bases thereof confronting the opposite of said webs, and a cohesive rigid lightweight cellular core substantially filling the spaces delineated by the confronting faces of said shell walls and said webs and said bases and adherent to said faces to define a truss structure formed of triangular sections constituted of substantially linear elements including respective pairs of said confronting walls, webs and bases and correspondingly sandwiched cellular core sections.

5. The structure of claim 4 wherein said upper and lower webs are defined by the upper and lower walls of an aircraft wing.

6. The structure of claim 4 including side webs joining corresponding edges of said upper and lower webs, said prisms being provided with end walls spaced from and confronting said side webs, and said cellular core filling the spaces between said webs and said prism end walls.

7. The structure of claim 5 including a support beam disposed adjacent a side wall of one of said prisms and extending along the length thereof.

8. An aircraft wing comprising a longitudinally extending outer shell of transverse airfoil configuration including upper and lower walls, a plurality of transversely spaced longitudinally extending triangular prismatic inner shells disposed in said outer shell and having transversely spaced side walls, the apices of different of said prismatic shells being alternately directed toward said upper and lower walls respectively and the bases of respective thereof being spaced from and confronting the opposite of said upper and lower walls, and a cohesive rigid lightweight cellular core substantially filling the spaces delineated by the outer faces of said prismatic shells and the inner faces of said outer shell and adhering thereto to define a truss structure formed of triangular sections constituted of substantially linear elements including respective pairs of said confronting walls and bases and correspondingly sandwiched cellular core sections.

9. The aircraft wing of claim 8 including aligned longitudinally spaced prismatic inner shells having confronting longitudinally spaced end faces, said cellular core filling said space between said end faces.

10. The aircraft wing of claim 8 wherein a longitudinally extending well is formed in the space between a pair of successive inner shells and a support beam registers with said well.

11. A structure comprising upper and lower webs, a plurality of transversely spaced sets of longitudinally spaced triangular prismatic inner shells having confronting longitudinally spaced end walls, said confronting walls of said sets of shells delineating a transversely extending panel space, and a cohesive rigid lightweight cellular core substantially filling the spaces delineated by the outer faces of said prismatic shells and said upper and lower webs and adhering thereto to define a truss structure formed of triangular sections constituted of substantially linear elements including respective pairs of shell walls and said webs and corresponding sandwiched core sections.

References Cited by the Examiner

UNITED STATES PATENTS

| 1,465,653 | 8/1923 | Olander | 50—335 |
| 2,427,853 | 9/1947 | Goodlett | 244—123 |
| 2,681,562 | 6/1954 | Clarke | 50—335 |
| 2,693,922 | 11/1954 | Ellison et al. | 244—123 |
| 3,078,202 | 2/1963 | Bellanca et al. | 9—6 X |

FOREIGN PATENTS

| 720,956 | 12/1954 | Great Britain. |
| 871,625 | 6/1961 | Great Britain. |
| 1,187,951 | 3/1959 | France. |

MILTON BUCHLER, *Primary Examiner.*

FERGUS S. MIDDLETON, *Examiner.*